Dec. 13, 1955　　　P. F. DANKOVICH, JR　　　2,726,736
EMERGENCY VEHICLE BRAKE
Filed Jan. 2, 1953　　　　　　　　　　　　　2 Sheets-Sheet 1
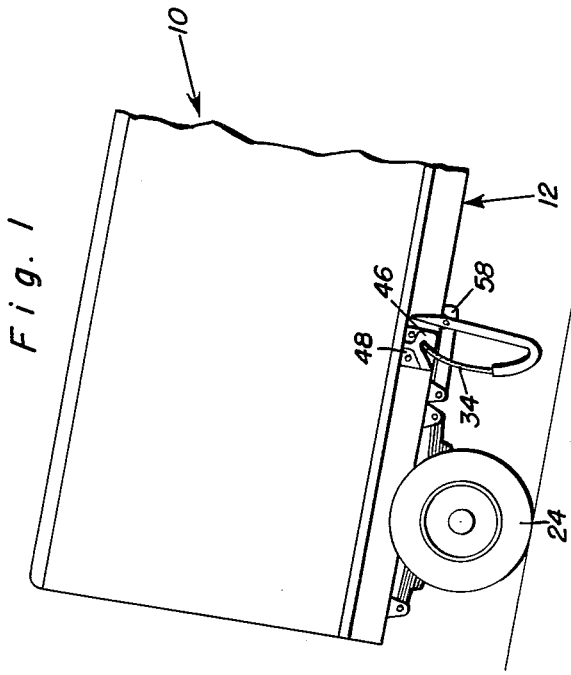
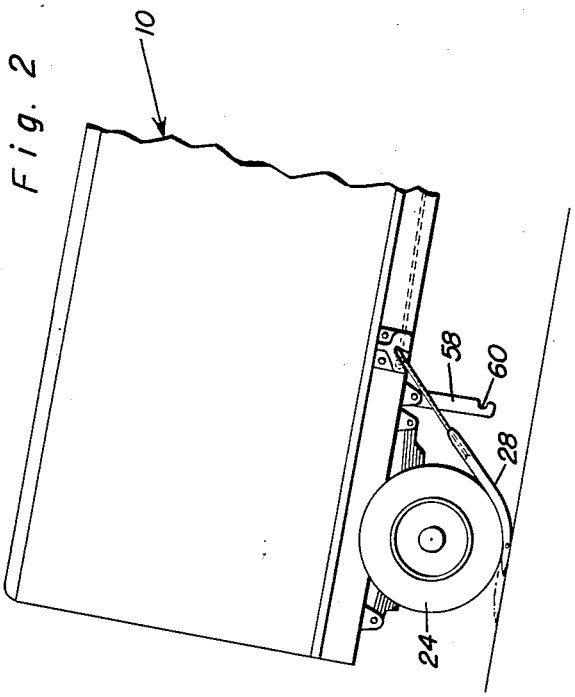
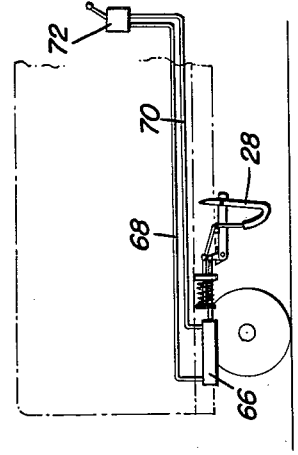
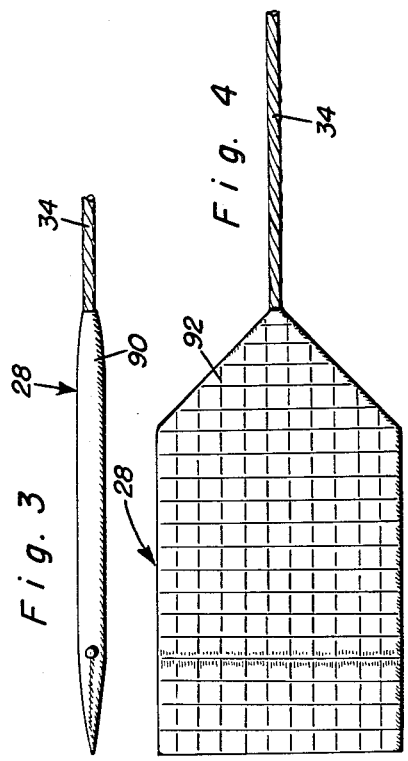
Paul F. Dankovich, Jr.
INVENTOR.
BY *Clarence A. O'Brien*
*and Harvey B. Jacobson*
Attorneys Dec. 13, 1955  P. F. DANKOVICH, JR  2,726,736
EMERGENCY VEHICLE BRAKE
Filed Jan. 2, 1953  2 Sheets-Sheet 2

Paul F. Dankovich, Jr.
INVENTOR.

BY Clarence A. O'Brien
and Harvey B. Jacobson
Attorneys

United States Patent Office 2,726,736
Patented Dec. 13, 1955

2,726,736
EMERGENCY VEHICLE BRAKE
Paul F. Dankovich, Jr., Adah, Pa.

Application January 2, 1953, Serial No. 329,387

3 Claims. (Cl. 188—4)

The present invention relates to brakes and more particularly relates to an emergency or safety braking attachment for motor vehicles.

The primary object of the invention is to provide an emergency braking device that is adapted primarily for use with heavy road vehicles, such as large trucks and the like, to be utilized upon failure of the conventional braking system of the vehicle or when, for various reasons, the motion of the vehicle may be out of control.

The device comprises primarily a pair of brake shoes or skid mats which are adapted to slip under the wheels of the vehicle and which may be mounted upon the vehicle frame in such a manner that the strains imposed as the wheels run over the shoes are distributed evenly over the frame.

Another object of the invention is to provide a novel skid mat or shoe construction which may be economically produced, which is extremely durable and is flexible.

Still another object of the invention is to provide a novel means for interconnecting the shoes on each side of the vehicle with one another and utilizing this connecting means in conjunction with a novel latching arrangement to maintain the shoes out of ground engaging position.

These, together with various ancillary objects and features which will later become apparent as the following description proceeds, are attained by this invention, a preferred embodiment of which is shown, by way of example only, in the accompanying drawings, wherein:

Figure 1 is a side elevational view of a vehicle with the brake attachment shown in inoperative position;

Figure 2 is a side elevational view of a vehicle with the braking attachment shown in operative position;

Figure 3 is a side view of one of the brake shoes;

Figure 4 is a top view of one of the brake shoes;

Figure 5 is a diagrammatic side view of the braking attachment showing the means for latching and releasing the shoes;

Figure 6 is a top view of one of the brake shoes with the covering removed therefrom;

Figure 7 is a sectional view of the shoe taken substantially along section line 7—7 of Figure 6;

Figure 8 is a sectional view of the shoe taken substantially along section line 8—8 of Figure 6; and Figure 9 is a top view of the rear portion of a vehicle frame with the braking device attached thereto.

Referring now to the accompanying drawings in detail, it is to be noted that like reference numerals are utilized to designate similar parts throughout the various views.

Referring first to Figures 1, 2, 5 and 9, the over-all picture of the braking attachment and its mounting on a vehicle frame may be most readily observed. The numeral 10 designates generally the rear portion of a conventional vehicle, shown in the preferred embodiment as a conventional truck-trailer. However, it is to be noted that the invention is equally applicable to other road vehicles of a similar nature, such as dump trucks, carryalls, or any other vehicle utilized to carry heavy loads. The vehicle 10 includes a frame 12 consisting of side frame members 14, a rear cross-member 16, and intermediate cross-members 18 and 20. Suspended from the side frame members 14 of the frame 12 is a rear axle 22 at the ends of which are journaled dual wheels 24. Although this construction is substantially conventional, it is to be noted that the intermediate cross-member 18 is disposed adjacent the rear axle 22 where it may be most effectively utilized as a portion of the support for the emergency braking attachment of the present invention, indicated generally by the numeral 26.

The braking device 26 comprises generally a pair of non-skid, flexible shoes or skid mats disposed at opposite sides of the frame 12 forwardly of the rear wheels 24 of the vehicle. A rod 30 extends underneath the frame 12 of the vehicle transversely thereof and connects the skid mats or shoes 28 to one another. Guide brackets 32 are mounted on the side frame members 14 of the frame 12 forwardly of the rear wheels 24 and flexible steel cables 34 connected at one set of their ends to the shoes 28 pass slidingly through the brackets 32, then converge toward one another so that their free ends terminate adjacent the intermediate cross frame member 18. Eye bolts 36 are pivotally attached to the free or terminal ends of the cables 34 and are slidably journaled in yokes 38 which are in turn secured in any suitable manner to the central portion of the cross-member 18. Disks or washers 40 are mounted on the free ends of the eye bolts 36 and retained thereon by means of nuts 42. Compression springs 44 concentrically surround the eye bolts 36 and have one of their ends seating against an associated bracket 38 and the other of their ends seated against the disk 40 whereby the eye bolts 36 are spring urged away from the guide brackets 32 so that they may function as shock absorbers when the brake shoes 28 are engaged.

The guide brackets 32 may be formed in such a manner as to clamp directly upon the side frame members 14 and be disposed therebeneath with the cables 34 slidably extending therethrough or they may be constructed as shown in the preferred embodiment of the invention as separate plates attached to either side of each side frame member 14 with the side frame member being apertured to slidingly receive the cable 34. As shown, the outer member of each bracket 32 constitutes an arcuately curved horizontally extending plate 46 forming a rearwardly and downwardly opening groove through which the cable 34 extends. A vertical attaching portion 48 formed integrally with the horizontally extending arcuate portion 46 serves to attach this portion of the bracket to the frame member 14. The backing plate 50 completes the bracket 32 and fasteners 54 extending through the side frame members 14 clamp the backing plate 50 to the guide plate 46 and to the side frame member 14.

Journaled at its ends and extending transversely between the side frame members 14 between the guide brackets 32 and the intermediate cross frame member 18 is a rock shaft 56 adjacent the ends of which are fixedly mounted latch bars 58. These latch bars 58 are formed with upwardly opening grooves adjacent their outer ends indicated by the numeral 60 into which the connecting rod 30 is received to hold the skid mats or shoes 28 in inoperative position out of ground engagement, as clearly shown in Figure 1. A rocker arm 62 is mounted on the rock shaft 56 and the end of a piston 64 of a hydraulic ram 66 mounted on the frame 12 is utilized to rock the shaft 56.

As will be noted in Figure 5, particularly, the fluid lines 68 and 70 for the ram 66 terminate in a hand operated valve arrangement 72 which is adapted to be mounted in the cab of the vehicle (not shown). Upon extension of the piston 64, the rock shaft 56 is rocked forwardly and the latch bars 58 are released from their connection with the connecting rod 30, and the shoes are dropped to ground engaging position, as shown in Figure 2, and the rear wheels 24 of the vehicle ride up over the shoes to bring the vehicle to a stop. Upon folding of the shoes upward so that the connecting rod rests immediately below the side frame members 14, the piston 64 is retracted and the latch bars 58 again engage the connecting rod 30 to hold the shoes out of ground engaging position. Obviously, a mechanical linkage for rocking the rock shaft 56 could be provided without departing from the spirit of the invention.

Each of the shoes or skid mats 28 is constructed as shown in Figure 6 of the drawings. Each shoe comprises a rigid bar or front rigid member 74 having a central slot 76 and notched ends 78. A rear rigid member 80 is spaced from and parallel to the front member 74. The rear member 80 constitutes a skid plate and comprises a rigid flat member having a wedge-shaped forward edge 82 and notches 84 in the rearward edge thereof. The connecting rod 30 extends through a bore 84 in each of the skid plates 80 parallel to the rearward edge thereof, and is secured at its projecting end against sliding movement in the bore by means of the nut 86. Flexible members innerconnect the rigid members 74 and 80, respectively, to one another. As will be noted, the attaching cable 34 extends through the central slot 76 and has its ends welded or otherwise secured in the central notch of the rear edge of the skid plate 80 whereby this portion of the cable 34 forms a portion of the shoe 28 and constitutes one of the flexible members. Brace cables 88 have one set of their ends welded in notches on either side of the central notch of the skid plate 80 and from this point, converge toward one another until they meet the cable 34 adjacent the notch 76 at which point they are welded to the cable 34. The end flexible members or cables 90 have one of their ends secured to the edge notches in the rear edge of the skid plate 80, have their intermediate portions disposed in the notched ends 78 of the front rigid member 74 and thence converge toward one another and are secured to the cable 34, as by welding or the like, at a point above the rigid member 74.

The above recited construction constitutes the basic framework for each skid shoe, or skid mat 28, and around this framework is a molded rubber cover 90 having tread 92 thereon to constitute a non-skid tread surface.

When the latch bars 58 are released and the shoes 28 are slipped under the rear wheels 24 of the vehicle, the strains on the cables 34 are first distributed to the side frame members 14 and thence, through the intermediate cross frame member 18, whereby the strains imparted as the vehicle is brought to a stop are distributed evenly over the rear portion of the frame 12, and in such a manner as to prevent any tendency for the frame to jack-knife about the rear wheels 24.

From the foregoing description, the construction and operation of the braking attachment will be understood. However, since numerous modifications and changes will readily occur to those skilled in the art after a perusal of the foregoing description, taken in conjunction with the accompanying drawings, it is not desired to limit the invention to the exact construction shown and described. But, all suitable modifications may be resorted to falling within the scope of the appended claims.

What is claimed as new is as follows:

1. A safety braking device for motor vehicles having a frame and rear wheels comprising a pair of non-skid, flexible shoes to receive the wheels thereupon in braking position, a rod connecting said shoes to one another and extending transversely beneath the vehicle frame, means for attaching said shoes to the vehicle frame and releasable latch means engaging said rod to maintain the shoes out of braking position, said shoes each comprising a pair of front and rear spaced, parallel rigid members connected by flexible members, and a flexible mat secured to said flexible members, said connecting rod being secured at each end to one of said rear rigid members, said front rigid member comprising a bar having notched ends, said rear rigid member comprising a plate having notches in the front edge thereof, said flexible members having one set of their ends secured in said front edge notches and having their other ends secured to said attaching means, portions of said flexible members being disposed in the notched ends of said front member, said attaching means including a flexible cable, and a portion of said cable constituting one of said flexible members.

2. The safety braking device of claim 1 wherein said attaching means for each shoe also includes a compression spring reacting on said vehicle frame, a bolt secured to the opposite end of one of said flexible members, and means connected with said bolt to compress said spring in response to axial movement of said bolt in one direction.

3. The safety braking device of claim 1 wherein said front rigid member has a central slot therein, and said cable extending through said slot and secured to said rear rigid member intermediate its ends.

References Cited in the file of this patent

UNITED STATES PATENTS

| | | |
|---|---|---|
| 1,313,103 | Mahoney | Aug. 12, 1919 |
| 1,392,987 | Unruh | Oct. 11, 1921 |
| 1,482,159 | Spung | Jan. 29, 1924 |
| 2,344,148 | Jackson | Mar. 14, 1944 |
| 2,385,689 | Christiansen | Sept. 25, 1945 |
| 2,562,521 | Blattner | July 31, 1951 |
| 2,658,587 | Velazquez | Nov. 10, 1953 |